(12) United States Patent
Yautz et al.

(10) Patent No.: US 11,422,233 B2
(45) Date of Patent: Aug. 23, 2022

(54) SENSOR SHIELD

(71) Applicants: Ford Global Technologies, LLC, Dearborn, MI (US); Argo AI, LLC, Mars, PA (US)

(72) Inventors: Dustin Yautz, Wexford, PA (US); Kenneth Jackson, Dearborn, MI (US); Srinivasa Damaraju, Fremont, CA (US); Ahmad Soufan, Lasalle (CA)

(73) Assignees: Ford Global Technologies, LLC, Dearborn, MI (US); Argo AI, LLC, Pittsburgh, PA (US)

( * ) Notice: Subject to any disclaimer, the term of this patent is extended or adjusted under 35 U.S.C. 154(b) by 982 days.

(21) Appl. No.: 16/161,820

(22) Filed: Oct. 16, 2018

(65) Prior Publication Data

US 2020/0116828 A1 Apr. 16, 2020

(51) Int. Cl.
*G01S 7/00* (2006.01)
*G01S 7/481* (2006.01)
*G01S 17/931* (2020.01)
*G01D 11/24* (2006.01)

(52) U.S. Cl.
CPC ........... *G01S 7/4813* (2013.01); *G01D 11/24* (2013.01); *G01S 17/931* (2020.01)

(58) Field of Classification Search
CPC ..................................................... G01S 17/931
See application file for complete search history.

(56) References Cited

U.S. PATENT DOCUMENTS

| | | | |
|---|---|---|---|
| 10,578,716 B1* | 3/2020 | Hu | G01S 13/865 |
| 11,220,154 B2* | 1/2022 | Diehl | G01P 1/026 |
| 2015/0192663 A1* | 7/2015 | Hunter | G01S 7/4813 |
| | | | 356/4.01 |
| 2020/0008840 A1* | 1/2020 | Addis | A61B 1/05 |

FOREIGN PATENT DOCUMENTS

| | | |
|---|---|---|
| CN | 202676191 U | 1/2013 |
| CN | 205113543 U | 3/2016 |
| CN | 205861083 U | 1/2017 |
| CN | 206394549 U | 8/2017 |
| CN | 207096440 U | 3/2018 |
| KR | 2020140001665 U | 3/2014 |

\* cited by examiner

*Primary Examiner* — Jamel E Williams
(74) *Attorney, Agent, or Firm* — Frank A. MacKenzie; Bejin Bieneman PLC (57) ABSTRACT

An assembly includes a housing arranged to house a sensor. The assembly includes a ring-shaped first shield supported by the housing. The assembly includes a second shield supported by the housing above the first shield and defining an outer perimeter greater than an inner perimeter, and less than an outer perimeter, of the first shield.

20 Claims, 6 Drawing Sheets

FIG. 6

SENSOR SHIELD

BACKGROUND

A vehicle may include a computer that receives data from one or more sensors, such as cameras, light detection and ranging (LIDAR) devices, etc. The data from the sensors may be used by the computer to operate the vehicle, e.g., in an autonomous mode or a semi-autonomous mode. Controlling temperature of the sensors may be beneficial.

DETAILED DESCRIPTION

An assembly includes a housing arranged to house a sensor. The assembly includes a ring-shaped first shield supported by the housing. The assembly includes a second ring-shaped shield supported by the housing above the first shield and defining an outer perimeter greater than an inner perimeter, and less than an outer perimeter, of the first shield.

The assembly may include a member connecting the first shield to the second shield.

The outer perimeter of the second shield may be vertically spaced above the inner perimeter of the first shield.

The first shield and the second shield may be concentric.

The sensor may be a LIDAR sensor.

The housing may have a bottom configured to mount to a vehicle.

The first shield may slope downwardly from the inner perimeter to the outer perimeter of the first shield.

The top of the housing may include a top surface, and the first shield may be supported by the top surface.

The first shield may have a top surface that includes a groove elongated radially between the inner perimeter and the outer perimeter of the first shield.

The assembly may include a rib on a bottom surface of the first shield elongated radially between the inner perimeter and the outer perimeter.

The housing may be within the inner perimeter of the first shield.

The assembly may include a third shield supported by the housing above the second shield and defining an outer perimeter that is greater than the inner perimeter of the second shield and less than the outer perimeter of the second shield.

The assembly may include a center shield supported by the housing below the second shield and defining an outer perimeter that is greater than the inner perimeter of the second shield.

The second shield and the center shield may be concentric.

The center shield may be in the inner perimeter of the first shield.

The first shield may be flat.

A top of the housing may have a circumferential surface, and the first shield may be supported by the circumferential surface.

An assembly includes means for housing a sensor. The assembly includes first means for shielding a housing. The assembly includes second means for shielding the housing above the first means for shielding the housing and defining an outer perimeter greater than an inner perimeter, and less than an outer perimeter, of the first means for shielding the housing.

The first means for shielding the housing may include means for directing water radially from the inner perimeter toward the outer perimeter of the first means for shielding the housing.

The first means for shielding the housing includes supporting means elongated radially between the inner perimeter and the outer perimeter of the first means for shielding the housing.

With reference to FIGS. 1-6, wherein like numerals indicate like parts throughout the several views, an assembly 20, 120 for collection of data to operate a vehicle 22 includes means for housing a sensor, such as a housing 26 arranged to house a sensor 28. The assembly 20, 120 includes first means for shielding the housing, such as a ring-shaped (i.e., substantially circular) first shield 32, 132 supported by the housing 26. The assembly 20, 120 includes second means for shielding the housing above the first means for shielding the housing, such as a second shield 36, 136 supported by the housing 26 above the first shield 32, 132. The first and second means for shielding the housing each define an outer perimeter 38, 138 greater than an inner perimeter 40, 140. The outer perimeter 38, 138 of the second means for shielding the housing is less than the outer perimeter 38, 138 of the first means for shielding the housing. The first means for shielding the housing and the second means for shielding the housing control a temperature of the sensor 28, e.g., by blocking the sensor 28 from sunlight L and by enabling airflow A proximate the means for housing the sensor.

The adjectives "first" and "second" are used throughout this document as identifiers and are not intended to signify importance or order. Relative orientations and direction (by way of example, top, bottom, above, below, etc.) are relative to an orientation of an occupant of the vehicle 22, an orientation of controls for operating the vehicle 22, e.g., an instrument panel, and a driving direction of the vehicle 22 when wheels of the vehicle 22 are substantially parallel with each other, etc. Orientation and direction relative to the assembly 20, 120 are given for when the assembly 20, 120 is supported by the vehicle 22 as described below and shown in the Figures.

The vehicle 22 may be any type of passenger or commercial automobile such as a car, a truck, a sport utility vehicle, a crossover vehicle, a van, a minivan, a taxi, a bus, etc. The vehicle 22 may operate in an autonomous mode, a semi-autonomous mode, or a non-autonomous mode. For purposes of this disclosure, an autonomous mode is defined as one in which each of a propulsion system, a braking system, and steering system are controlled by a computer; in a semi-autonomous mode the computer controls one or two of the propulsion system, the braking system, and steering system; in a non-autonomous mode, a human operator controls the propulsion system, the braking system, and the steering.

The sensors 28 may detect the external world, for example, radar sensors, scanning laser range finders, light detection and ranging (LIDAR) devices, and image processing sensors such as cameras. The sensors 28 may be in communication with the computer, e.g., to provide data to the computer.

The vehicle 22 may include the computer. The computer may be a microprocessor-based computing device implemented via circuits, chips, or other electronic components. For example, the computer may include a processor, memory, etc. The memory of the computer may store instructions executable by the processor as well as data and/or databases. The computer may be programmed to operate the vehicle 22 in the autonomous mode and/or the semi-autonomous mode based at least in part on data received from the sensor 28.

The means for housing the sensor protects the sensor 28, e.g., from water, dirt, etc. The means for housing the sensor may be the housing 26 arranged to house the sensor 28. For example, the housing 26 may include a top 41, a bottom 42, and one or more sides 44 that together define a chamber 46. The sensor 28 may be in the chamber 46. The sensor 28 may be supported by the bottom 42. The sides 44 may be transparent and permit light to pass therethrough to the sensor 28. The sides 44 may by cylindrical. The housing 26 may be metal, plastic, or any material suitable for protecting the sensor 28.

The bottom 42 may be configured to mount to the vehicle 22. For example, a profile of the bottom 42 may be complementary to a profile of a top surface 48 of a roof 50 of the vehicle 22, e.g., such that the bottom 42 may abut the roof 50 without any gaps, spaces, etc., therebetween. As another example, the bottom 42 may include holes or other structures that receive fasteners, clips, etc., which secure the housing 26 to the vehicle 22.

The top 41 of the housing 26 may include a top surface 52. The top surface 52 may face upward, e.g., relative to the vehicle 22, away from the roof 50, etc. The top 41 of the housing 26 may have a circumferential surface 54, e.g., extending around the housing 26 and facing radially outward, e.g., away from the chamber 47 and relative to a vertical axis A1 that extends from the top 41 to the bottom 42.

The first means for shielding the housing, e.g., the first shield 32, 132, and the second means for shielding the housing, e.g., the second shield 36, 136, control a temperature of the housing 26 and the sensor 28 therein by blocking sunlight L from, and enabling airflow A proximate, the housing 26.

The first shield 32, 132 and the second shield 36, 136 are ring-ring shaped, i.e., each defining a respective inner perimeter 40, 140 and outer perimeter 38, 138. The inner perimeters 40, 140 and the outer perimeters 38, 138 may be substantially circular and define respective diameters.

The second means for shielding the housing is above the first means for shielding the housing. For example, the first shield 32, 132 may be spaced above the second shield 36, 136 relative to the vertical axis A1, e.g., defining a gap 56 therebetween. The gap 56 is of sufficient size to permit airflow therethrough to control temperature of the sensor. For example, the gap 56 may be 0.25 inches as measured relative to the vertical axis A1. As another example, the first shield 32, 132 may be between the second shield 36, 136 and the bottom 42 of the housing 26.

The outer perimeter 38, 138 of the second means for shielding the housing is greater than the inner perimeter 40, 140, and less than the outer perimeter 38, 138, of the first means for shielding the housing. For example, the outer diameter D1 (shown in FIGS. 3 and 6) of the second shield 36, 136 may be greater than the inner diameter D2 of the first shield 32, 132, and less than the outer diameter D3 of the first shield 32, 132. The outer diameter D1 of the second shield 36, 136 may be sufficiently greater than the inner diameter D2 of the first shield 32, 132 such that the second shield 36, 136 partially overlaps the first shield 32, 132 perpendicular the vertical axis A1, e.g., to the to block light L from striking the top 41 of the housing 26 at a predetermined range of angles, e.g., within 45 degrees of the vertical axis A1. The dimensions of the diameters D1, D2, and the gap 36 may be determined using computer simulation and/or real-world testing to optimize air flow, shade coverage, material mass, etc., for controlling the temperature of the sensor 28. For example, the outer diameter D1 of the second shield 36, 136 may be 0.5 inches greater than the inner diameter D2 of the first shield 32, 132 when the gap 56 is 0.25 inches. The outer diameter D3 of the first shield 32, 132 may be sufficiently greater than the outer diameter D1 of the second shield 36, 136 such that the first shield 32, 132 blocks light L from striking the top 41 of the housing 26 at the predetermined range of angles and provides a pyramid-shape to the assembly 20, 120, as discussed below.

The outer perimeter 38, 138 of the second shield 36, 136 may be vertically spaced above the inner perimeter 40, 140 of the first shield 32, 132, e.g., relative to the vertical axis A1. For example, the gap 56 may be between the outer perimeter 38, 138 of the second shield 36, 136 and the inner perimeter 40, 140 of the first shield 32, 132 relative to the vertical axis A1.

The first shield 32, 132 and the second shield 36, 136 may be concentric. Concentric shields 32, 132, 36, 136 provide the hollow pyramid-shape to the assembly 20, 120 that channels airflow from the gap 56 upward through the assembly 20, 120. For example, a center of the outer perimeter 38, 138 of the first shield 32, 132 and a center of the outer perimeter 38, 138 of the second shield 36, 136 may be aligned, e.g., along the vertical axis A1. As another example, a center of the inner perimeter 40, 140 of the first shield 32, 132 and a center of the inner perimeter 40, 140 of the second shield 36, 136 may be aligned, e.g., along the vertical axis A1.

The second shield 36, 136 may be supported by the first shield 32, 132. For example, the assembly 20, 120 may include a member 58 connecting the first shield 32, 132 to the second shield 36, 136. The member 58 may be fixed to the first shield 32, 132 and/or the second shield 36, 136, e.g., with a fastener, adhesive, friction welding, etc. The member 58 and the first shield 32, 132 and/or the second shield 36, 136 may be monolithic, i.e., a single piece of material with no seams, joints, fasteners, or adhesives holding the member 58 and the first shield 32, 132 and/or the second shield 36, 136 together.

Figure 1:
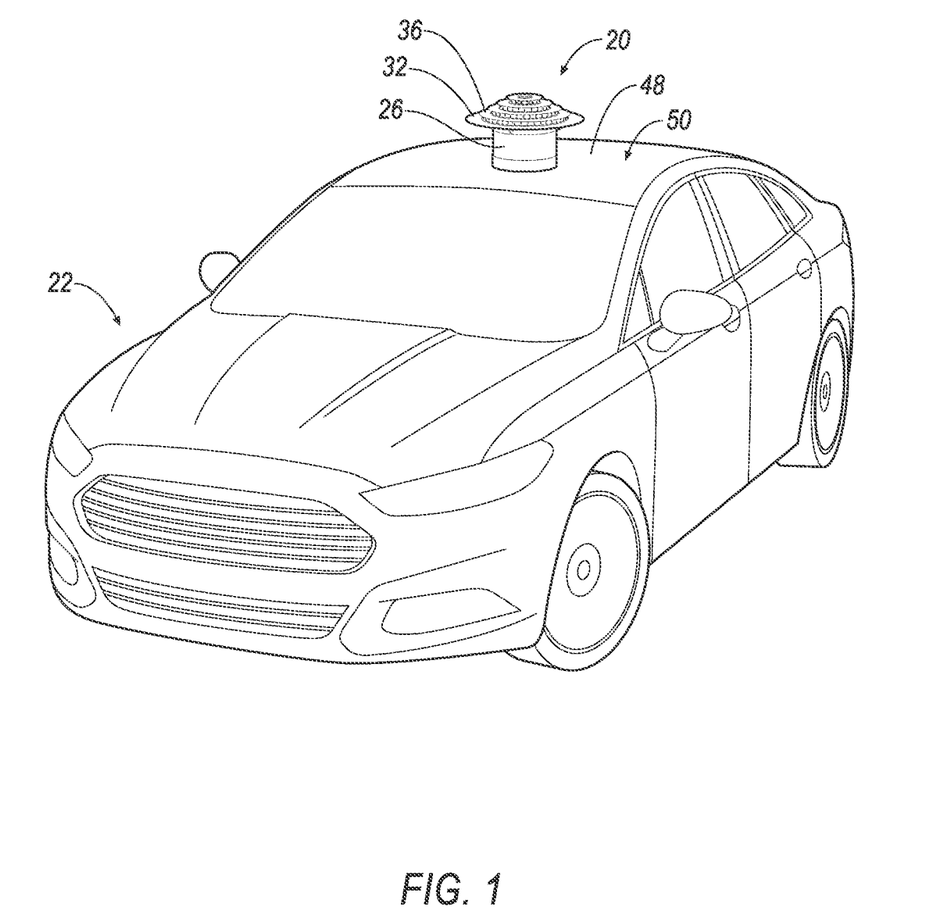
FIG. 1 is a perspective view of a vehicle having an example assembly that houses a sensor.
Figure 2:
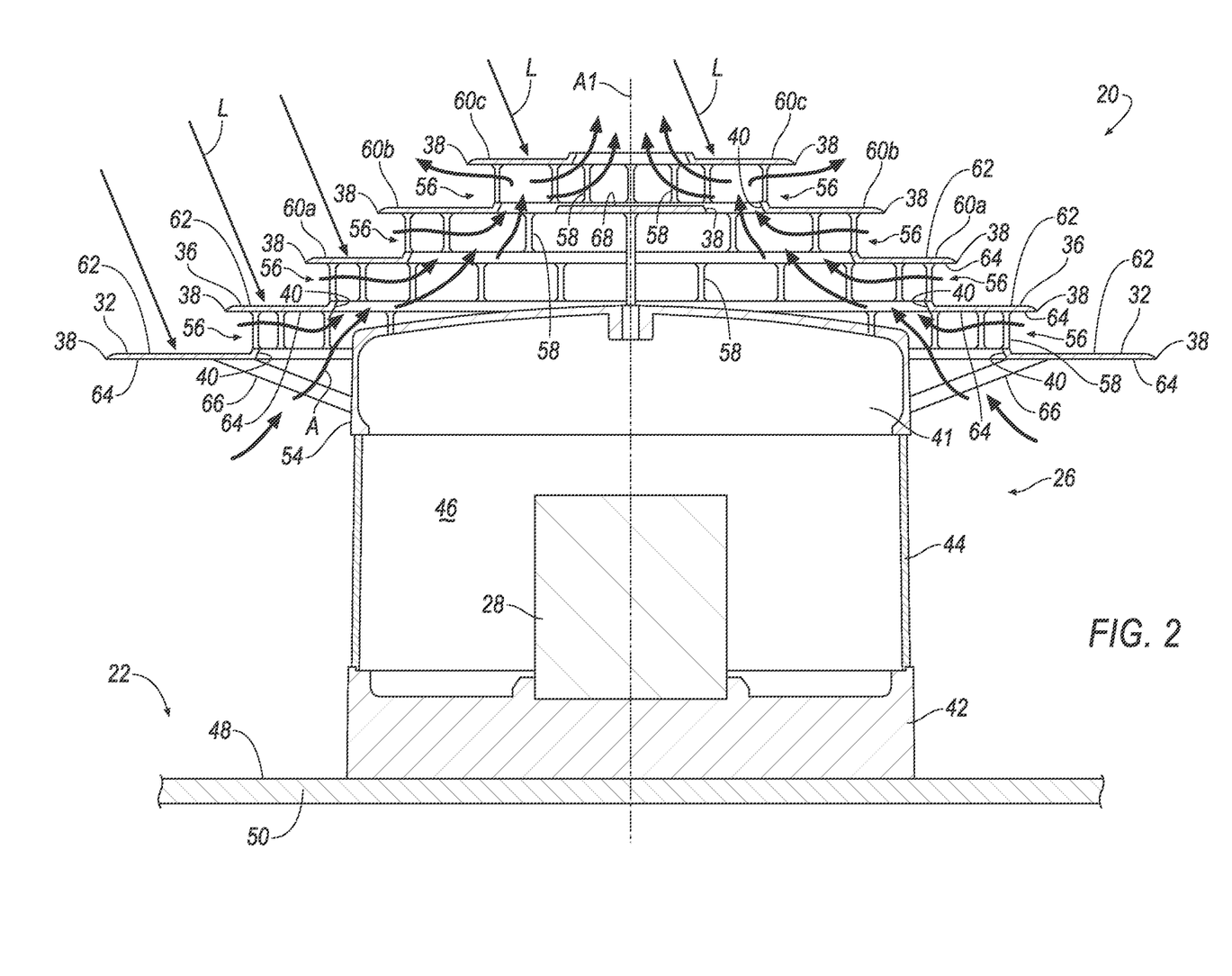
FIG. 2 is a cross section of the assembly that houses the sensor.
Figure 3:
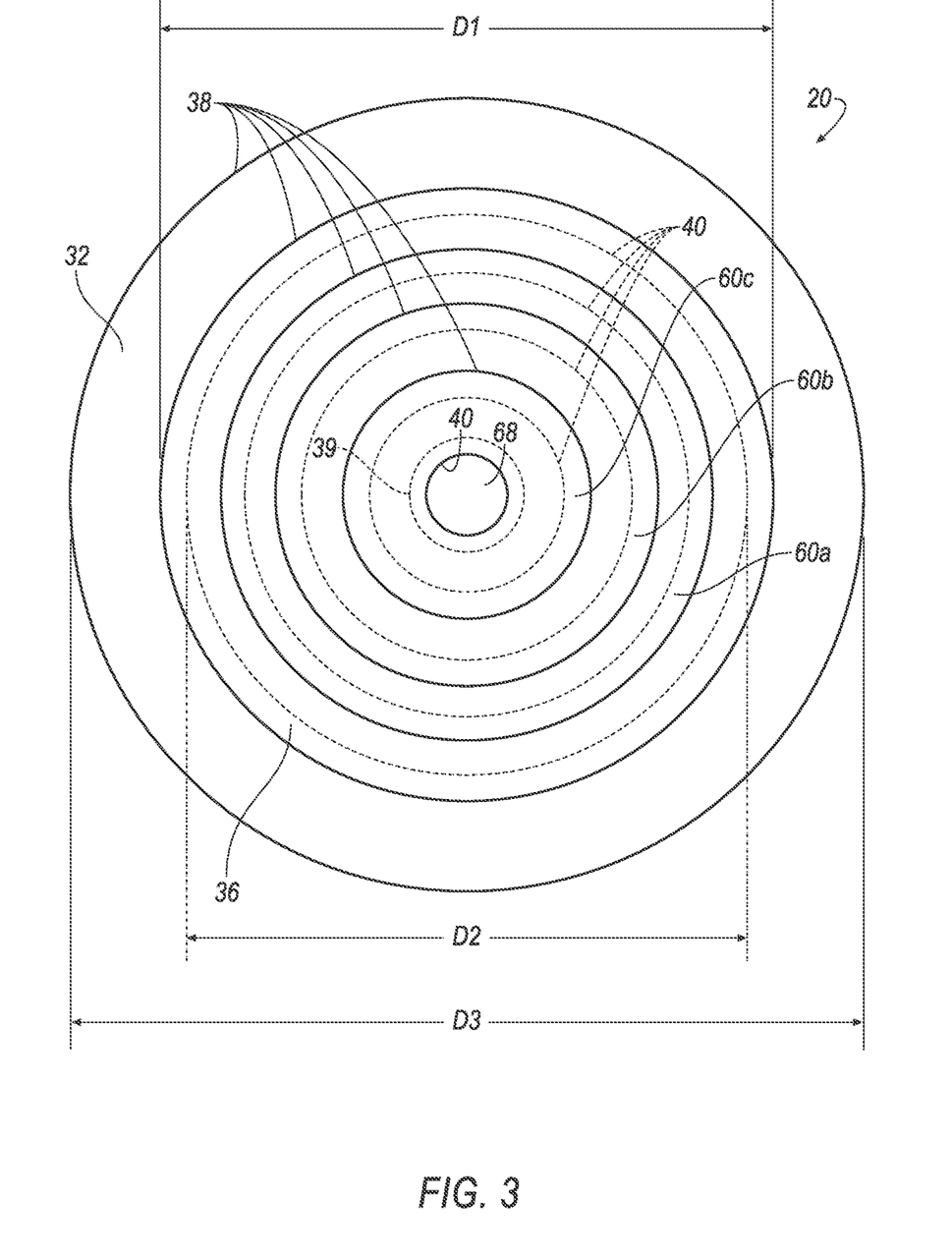
FIG. 3 is a top view of the assembly that houses the sensor.

With reference to the assembly 20 shown in FIGS. 1-3, the assembly 20 may include one or more additional shields 60a, 60b, 60c. The additional shields 60a, 60b, 60c may be ring-shaped and define inner perimeters 40 and outer perimeters 38. The additional shields 60a, 60b, 60c may be supported by the housing 26, e.g., above the first shield 32 and the second shield 36. The additional shields 60a, 60b, 60c may be spaced above the first shield 32 and the second shield 36 to further define the hollow pyramid-shape, e.g., the shields 60a, 60b, 60c may be progressively smaller. For example, the outer perimeter 38 of the shield 60a directly above the second shield 36 may be greater than the inner perimeter 40 of the second shield 36 and less than the outer perimeter 38 of the second shield 36. The outer perimeter 38 of the shield 60b directly above such shield 60a may be greater than the inner perimeter 40 of the shield 60a directly above the second shield 36 and less than the outer perimeter 38 of the shield 60a directly above the second shield 36, and so on.

The shields 32, 36, 60a, 60b, 60c may be flat. For example, each shield 32, 36, 60a, 60b, 60c may include a top surface 62 opposite a bottom surface 64. The top surface 62 and the bottom surface 64 may be flat. The top surface 62 and the bottom surface 64 may be parallel and at same position relative to the vertical axis A1, e.g., a same distance from the bottom 42 of the housing 26. The top surface 62 and the bottom surface 64 may extend radially from the inner perimeter 40 to the respective outer perimeter 38 and perpendicular to the vertical axis A1.

The housing 26 may be within the inner perimeter 40 of the first shield 32. For example, the first shield 32 may be at or below the top surface 52 of the housing 26, and the housing 26 may be concentric with the inner perimeter 40 of the first shield 32.

The first shield 32 may be supported by the circumferential surface 54. For example, a support member 66 may extend from the circumferential surface 54 of the housing 26 to the bottom surface 64 of the first shield 32. The support member 66 may be fixed to the first shield 32 and/or the housing 26, e.g., with a fastener, adhesive, friction welding, etc. The support member 66 and the first shield 32 and/or the housing 26 may be monolithic.

The assembly 20 may include a center shield 68. The center shield 68 is supported by the housing 26 below the top-most of the shields 60c. For example, the center shield 68 may be below the shield 60c spaced farthest above the housing 26 relative to the other shields 32, 36, 60a, 60b along the vertical axis A1. The center shield 68 defines an outer perimeter 39 that is greater than the inner perimeter 40 of the top most of the shields 60c. The center shield 68 may be circular. The center shield 68 may be free of an inner perimeter. One or more of the members 58 may connect the center shield 68 to the top most of the shields 60c. The center shield 68 and the top most of the shields 60c may be concentric. The center shield 68 may be in the inner perimeter 40 of the first shield 32. For example, the outer perimeter 38 of the center shield 68 may be smaller (i.e., have a smaller radius) than, and concentric with, the inner perimeter 40 of the first shield 32.

Figure 4:
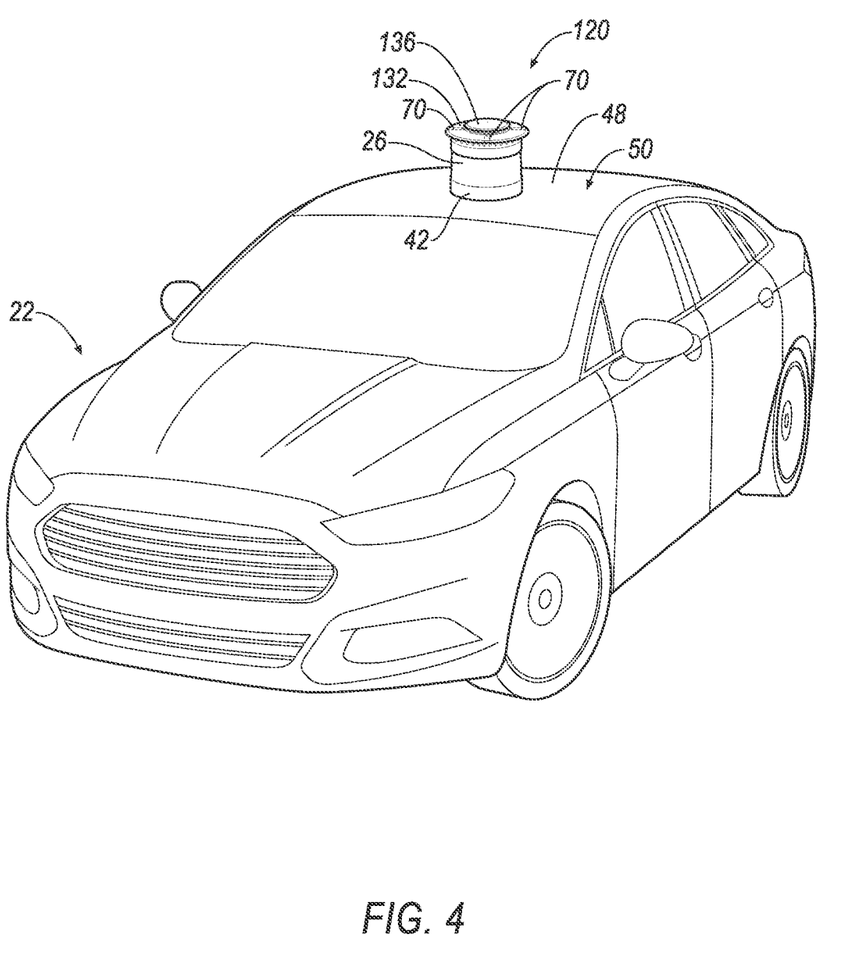
FIG. 4 is a perspective view of the vehicle having another example of an assembly that houses a sensor.
Figure 5:
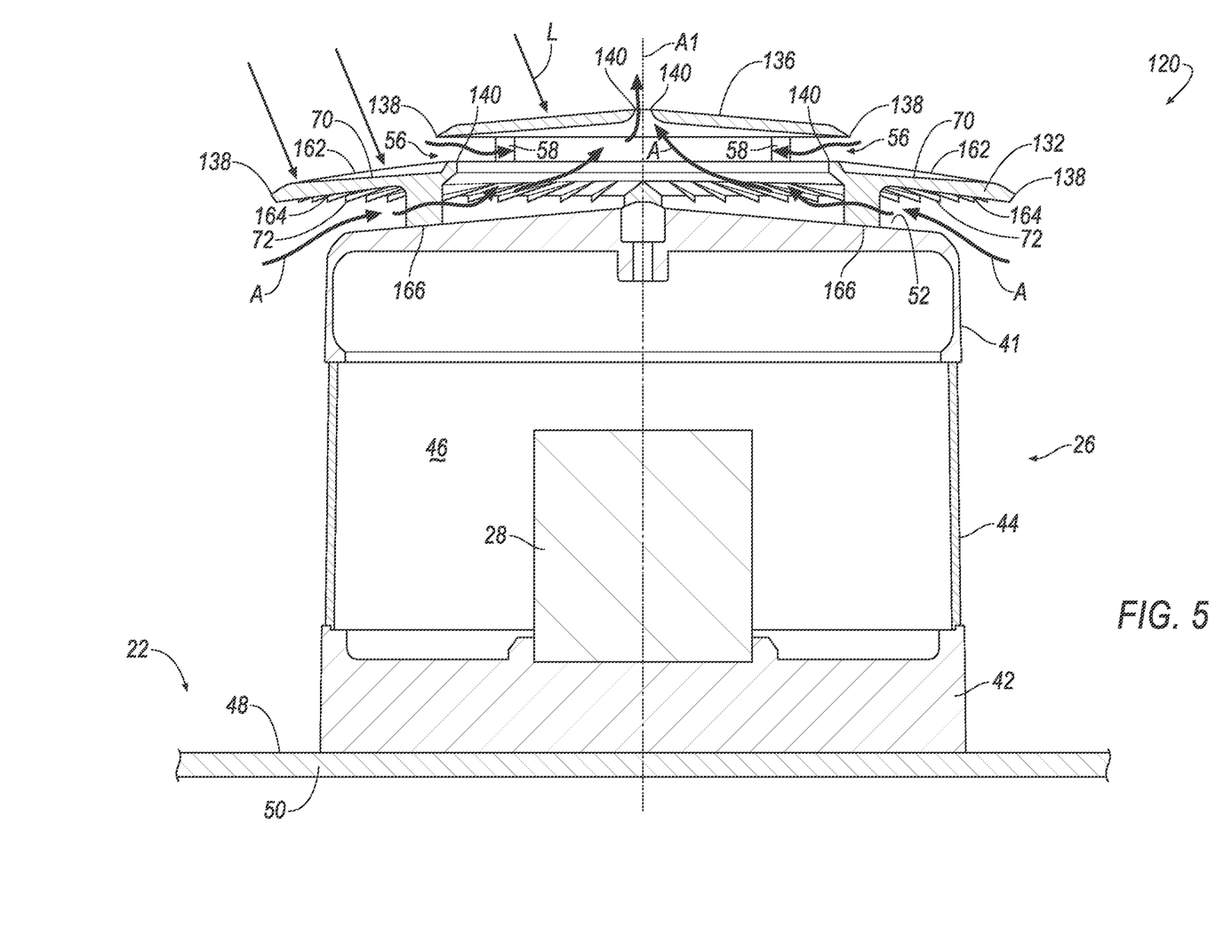
FIG. 5 is a cross section of the assembly that houses the sensor of FIG. 4.
Figure 6:
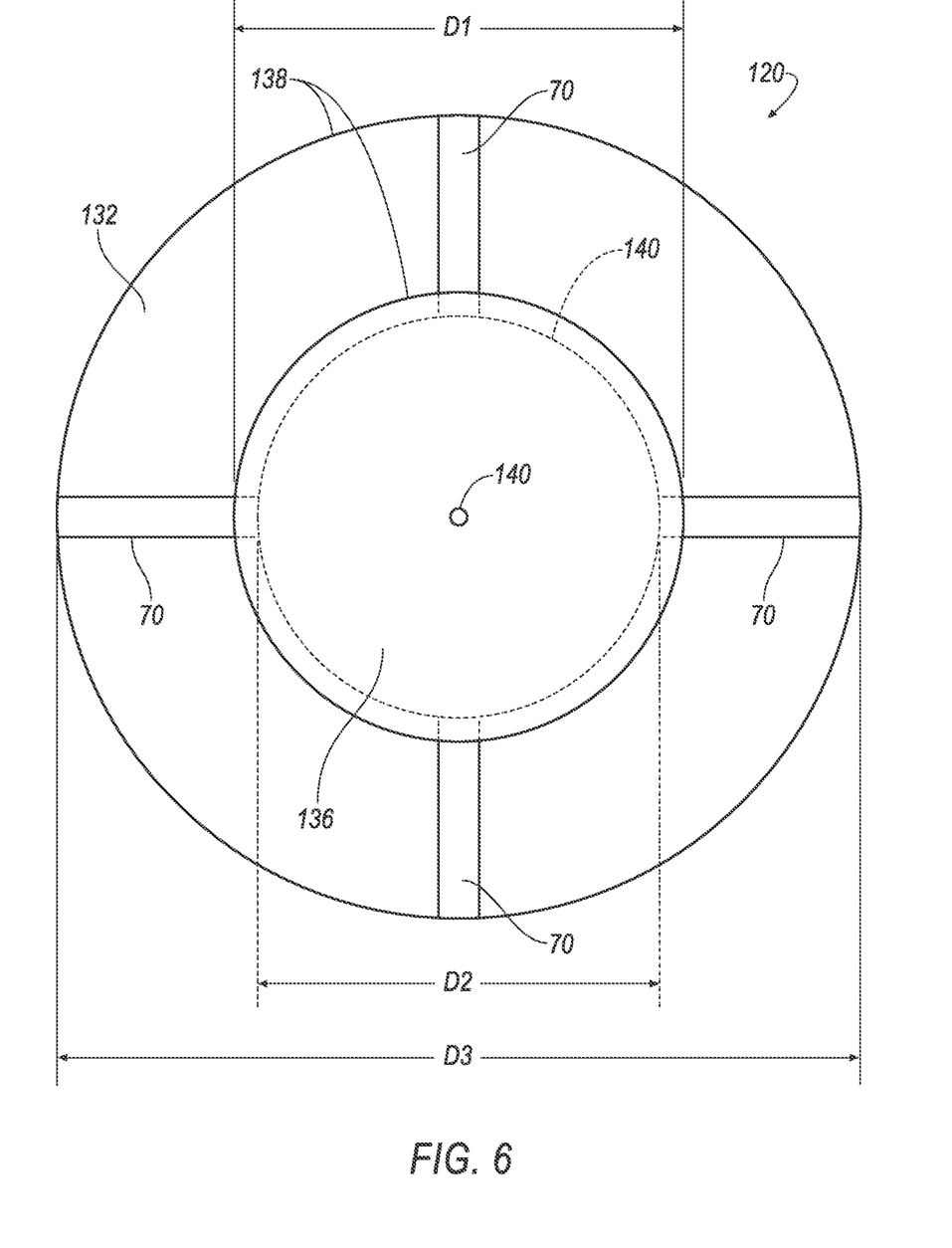
FIG. 6 is a top view of the assembly that houses the sensor of FIG. 4.

With reference to the assembly 120 shown in FIGS. 4-6, the first shield 132 may be supported by the top surface 52 of the housing 26. For example, a support member 166 may extend from the top surface 52 of the housing 26 to the bottom surface 64 of the first shield 132. The support member 166 may be fixed to the first shield 132 and/or the housing 26, e.g., with a fastener, adhesive, friction welding, etc. The support member 166 and the first shield 132 and/or the housing 26 may by monolithic.

The first means for shielding the housing may include means for directing water radially from the inner perimeter 140 toward the outer perimeter 138 of the first means for shielding the housing. For example, the first shield 132 may slope downwardly from the inner perimeter 140 to the outer perimeter 138 of the first shield 132. In other words, the inner perimeter 140 of the first shield 132 may be above the outer perimeter 138 of the first shield 132, e.g., relative to the vertical axis A1, the top 41 and the bottom 42 of the housing 26, etc. The downward slope causes gravity to urge water that may be on the top surface 62 toward the outer perimeter 138. As another example, a top surface 162 of the first shield 132 may include a groove 70 elongated radially between the inner perimeter 140 and the outer perimeter 138 of the first shield 132. The groove 70 may be recessed downward from the top surface 162 of the first shield 132. The groove 70 collects and directs water that may be on the top surface 162. The means for directing water radially from the inner perimeter 140 toward the outer perimeter 138 of the first means for shielding the housing may include other structure(s) that direct water.

The first means for shielding the housing may include supporting means elongated radially between the inner perimeter 140 and the outer perimeter 138. For example, the shields 132, 136 may include ribs 72 on the bottom surface 164. The ribs 72 may extend downward, e.g., toward the bottom 42 of the housing 26. The ribs 72 strengthen the shield 132, 136, e.g., by increasing stiffness. The ribs 72 may be elongated radially between the inner perimeter 140 and the outer perimeter 138. Elongation radially between the perimeters 138, 140 enables airflow A from the outer perimeter 138 to the inner perimeter 140 between the ribs 72. The ribs 72 may additionally direct fluid, e.g., over spray fluid from a sensor cleaning system that strikes the bottom surface 164 may travel along the ribs 72 to the outer perimeter 138. The supporting means may include other structure(s) that strengthen the shield 132, 136

With reference to FIGS. 2 and 5, the assembly 20, 120 controls a temperature of the sensor 28. For example, the shields 32, 132, 36, 136, 60a, 60b, 60c may block sunlight L from reaching the housing 26. As another example, the shields 32, 132, 36, 136, 60a, 60b, 60c permit airflow A through the gap 56 between the shields 32, 132, 36, 136, 60a, 60b, 60c. The heat from the sensor 28 warms the airflow A which rises and flows through an area enclosed by the inner perimeters 40, 140 of the shields 32, 132, 36, 136, 60a, 60b, 60c, and out the area enclosed by the inner perimeter 40, 140 of the top most shield 36, 136 (shown in FIG. 4) and/or out the gap 56 between the top most shield 60c, the shield 60b directly below the top most shield 60c, and the gap 56 between the top most shield 60c and the center shield 68.

Although certain features have been descried with relation to only one of the examples disclosed herein, such features may be included in both examples. For example, the shields 60 of the assembly 20 shown in FIGS. 1-3 may include ribs, grooves, etc.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. An assembly, comprising:
a housing arranged to house a sensor;
a ring-shaped first shield supported by the housing, the first shield defining an inner perimeter and an outer perimeter; and
a ring-shaped second shield supported by the housing above the first shield and defining an outer perimeter greater than the inner perimeter of the first shield and less than the outer perimeter of the first shield.

2. The assembly of claim 1, further comprising a member connecting the first shield to the second shield.

3. The assembly of claim 1, wherein the outer perimeter of the second shield is vertically spaced above the inner perimeter of the first shield.

4. The assembly of claim 1, wherein the first shield and the second shield are concentric.

5. The assembly of claim 1, wherein the sensor is a LIDAR sensor.

6. The assembly of claim 1, wherein the housing has a bottom configured to mount to a vehicle.

7. The assembly of claim 1, wherein the first shield slopes downwardly from the inner perimeter to the outer perimeter of the first shield.

8. The assembly of claim 1, wherein a top of the housing includes a top surface, and the first shield is supported by the top surface.

9. The assembly of claim 1, wherein the first shield has a top surface that includes a groove elongated radially between the inner perimeter and the outer perimeter of the first shield.

10. The assembly of claim 1, further comprising a rib on a bottom surface of the first shield elongated radially between the inner perimeter and the outer perimeter.

11. The assembly of claim 1, wherein the housing is within the inner perimeter of the first shield.

12. The assembly of claim 1, further comprising a third shield supported by the housing above the second shield and defining an outer perimeter that is greater than the inner perimeter of the second shield and less than the outer perimeter of the second shield.

13. The assembly of claim 1, further comprising a center shield supported by the housing below the second shield and defining an outer perimeter that is greater than the inner perimeter of the second shield.

14. The assembly of claim 13, wherein the second shield and the center shield are concentric.

15. The assembly of claim 14, wherein the center shield is in the inner perimeter of the first shield.

16. The assembly of claim 1, wherein the first shield is flat.

17. The assembly of claim 1, wherein a top of the housing has a circumferential surface, and the first shield is supported by the circumferential surface.

18. An assembly, comprising:
means for housing a sensor;
first means for shielding a housing, the first means for shielding the housing defining an inner perimeter and an outer perimeter; and
second means for shielding the housing above the first means for shielding the housing and defining an outer perimeter greater than the inner perimeter of the first means for shielding the housing and less than the outer perimeter of the first means for shielding the housing.

19. The assembly of claim 18, wherein the first means for shielding the housing includes means for directing water radially from the inner perimeter toward the outer perimeter of the first means for shielding the housing.

20. The assembly of claim 18, wherein the first means for shielding the housing includes supporting means elongated radially between the inner perimeter and the outer perimeter of the first means for shielding the housing.

\* \* \* \* \*